United States Patent
Hoerwick et al.

(10) Patent No.: US 9,457,813 B2
(45) Date of Patent: Oct. 4, 2016

(54) CARRIAGEWAY RECOGNITION

(71) Applicant: Bayerische Motoren Werke Aktiengesellschaft, Munich (DE)

(72) Inventors: Marcus Hoerwick, Munich (DE); Loren Schwarz, Munich (DE); Martin Buchner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 14/550,563

(22) Filed: Nov. 21, 2014

(65) Prior Publication Data
US 2015/0166070 A1   Jun. 18, 2015

Related U.S. Application Data

(63) Continuation of application No. PCT/EP2013/060215, filed on May 17, 2013.

(30) Foreign Application Priority Data

May 24, 2012   (DE) .......................... 10 2012 208 740

(51) Int. Cl.
*B60W 40/02* (2006.01)
*G06K 9/00* (2006.01)
(Continued)

(52) U.S. Cl.
CPC .............. *B60W 40/02* (2013.01); *B60W 40/06* (2013.01); *G06K 9/00798* (2013.01);
(Continued)

(58) Field of Classification Search
CPC .............. B60W 40/02; B60W 40/06; B60W 2520/10; B60W 2520/06; B60W 40/072; G06K 9/00798; G08G 1/056; G08G 1/09623; G08G 1/09626
See application file for complete search history.

(56) References Cited

U.S. PATENT DOCUMENTS

| 7,801,659 B2 | 9/2010 | Leineweber et al. |
| 8,065,084 B2 | 11/2011 | Urban et al. |
| 8,818,694 B2 | 8/2014 | Staempfle et al. |

(Continued)

FOREIGN PATENT DOCUMENTS

| DE | 100 42 980 A1 | 3/2002 |
| DE | 10 2005 007 802 A1 | 8/2006 |

(Continued)

OTHER PUBLICATIONS

International Search Report dated Oct. 2, 2013 (Three (3) pages).
(Continued)

*Primary Examiner* — Rodney Butler
*Assistant Examiner* — Frederick Brushaber
(74) *Attorney, Agent, or Firm* — Crowell & Moring LLP

(57) ABSTRACT

An assessment of whether a roadway is directional is provided. The assessment includes stipulating a dimension if not previously calculated, and receiving of an output from an apparatus for environment recognition for a vehicle, which output is based on recognition of an environment of the vehicle at one instant. The assessment also include associating a factor with the output, wherein the factor is based on a speed of the vehicle at the instant associated with the output. The output is mapped into a rating value in accordance with a predefined mapping specification, and the factor is associated with the rating value. The dimension is then calculated based on a sum that is based on the rating value weighted with the associated factor, and on the previously calculated or stipulated dimension, after which the dimension can be provided.

20 Claims, 5 Drawing Sheets

(51) Int. Cl.
*G08G 1/0962* (2006.01)
*B60W 40/06* (2012.01)
*G08G 1/056* (2006.01)
*B60W 40/072* (2012.01)

(52) U.S. Cl.
CPC ......... *G08G 1/056* (2013.01); *G08G 1/09623* (2013.01); *G08G 1/09626* (2013.01); *B60W 40/072* (2013.01); *B60W 2520/06* (2013.01); *B60W 2520/10* (2013.01)

(56) References Cited

U.S. PATENT DOCUMENTS

| | | | | |
|---|---|---|---|---|
| 2002/0198632 | A1* | 12/2002 | Breed | B60N 2/2863 701/1 |
| 2003/0191568 | A1* | 10/2003 | Breed | B60W 40/06 701/36 |
| 2005/0060069 | A1* | 3/2005 | Breed | B60N 2/2863 701/408 |
| 2005/0134440 | A1* | 6/2005 | Breed | B60N 2/2863 340/435 |
| 2007/0208495 | A1* | 9/2007 | Chapman | G08G 1/0104 701/117 |

FOREIGN PATENT DOCUMENTS

| | | |
|---|---|---|
| DE | 10 2005 039 103 A1 | 3/2007 |
| DE | 10 2006 019 111 A1 | 10/2007 |
| DE | 10 2007 048 842 A1 | 9/2008 |
| DE | 10 2008 017 972 A1 | 10/2009 |
| EP | 2 164 057 A1 | 3/2010 |
| WO | WO 2005/040950 A1 | 5/2005 |

OTHER PUBLICATIONS

German Search Report dated Jan. 29, 2013, with Statement of Relevancy (Five (5) pages).

Collado et al., "Detection and Classification of Road Lanes with a Frequency Analysis", Intelligent Vehicles Symposium, 2005. Proceedings. IEEE Las Vegas, NV, Jun. 6-8, 2005, Piscataway, NJ, Jun. 6, 2005, XP010833947, 6 pages.

Kasprzak et al., "Adaptive Road Recognition and Ego-state Tracking in the Presence of Obstacles", International Journal of Computer Vision, Kluwer Academic Publishers, Norwell, US, vol. 28, No. 1, Jan. 1, 1998, XP002507347, 22 pages.

\* cited by examiner

CARRIAGEWAY RECOGNITION

CROSS REFERENCE TO RELATED APPLICATIONS

This application is a continuation of PCT International Application No. PCT/EP2013/060215, filed May 17, 2013, which claims priority under 35 U.S.C. §119 from German Patent Application No. 10 2012 208 740.0, filed May 24, 2012, the entire disclosures of which are herein expressly incorporated by reference.

BACKGROUND AND SUMMARY OF THE INVENTION

The present invention relates to the field of driver assistance systems and more precisely to a method for providing an assessment of whether a roadway is directional, and to an apparatus that is set up for this purpose.

In this case, directional roadway denotes a roadway that is separate from other roadways and on which the vehicles move in the same direction of travel. A roadway may comprise a plurality of lanes. The separation indicates that there is not provision for even just temporary changeover of vehicles to the other roadway, and can be effected by physical partitions, such as guardrails, green median strips, walls, etc. As an example of a directional roadway, FIG. 1 shows a freeway that comprises two roadways physically separated by a guardrail. On each roadway, the vehicles move in multiple lanes in the same direction of travel. FIG. 2 shows a normal major road with two roadways, each of which has an allocated direction of travel. The style of the centerline indicates that overtaking maneuvers on the opposite roadway are permitted, for example. FIG. 2 therefore shows two roadways that are not directional.

The recognition that the vehicle is on a directional roadway can be used by various driver assistance systems (what are known as subscriber functions or subscribers) in order to improve the operation thereof or to make it possible in the first place. By way of example, an emergency steering assistant can decide, on the basis of whether or not the vehicle is on a directional roadway and hence oncoming traffic can be expected in lanes, the direction in which an emergency steering maneuver needs to be performed. In addition, the activation of a congestion assistant or automatic cruise control can be made dependent on whether the vehicle is on a directional roadway.

In general, navigation systems are known that access digital maps and frequently also indicate the type of the roads stored, that is to say the types country road or freeway. On this basis and by means of localization, for example using GPS, navigation systems are generally capable of providing a statement about whether the vehicle is on a freeway and therefore on a directional roadway.

However, localization within a map as described above can result in erroneous determination of whether or not the vehicle is on a directional roadway. For example, it is possible for the data of the map to be outdated or imprecise, or for a temporary change to have occurred. Furthermore, it is possible for information pertaining to the road type to be missing or for the localization of the vehicle to be imprecise.

The document DE 10042980 A1 discloses a system that recognizes road signs and information panels. On road sections with multiple lanes, the maximum speeds associated with the respective lanes are sensed and the lane that the motor vehicle is on is recognized.

The document DE 10 2005 007 802 A1 discloses a method for object plausibilization in driver assistance systems. In this method, an attempt is made to gauge the probabilities of the driver's own vehicle being in the outermost right-hand or the outermost left-hand lane. To this end, the intervals between objects at the verge of the roadway and the center of the driver's own vehicle are determined and are compared with an assumption for the width of a lane. On this basis and taking account of the statistical variances in the determination of the intervals, the probabilities of the verge of the roadway being immediately to the right or left of the driver's own vehicle are determined. These probabilities are subjected to low-pass filtering.

It is an object of the invention to provide reliable recognition of directional roadways and an apparatus that is set up for this purpose.

Further advantageous embodiments are defined in the dependent claims.

FIG. 3 shows an exemplary inventive apparatus 300 that is installed in a vehicle (not shown). Features that are merely optional are shown in dashes. The apparatus 300 is set up to receive the output A from at least one apparatus for environment recognition 302 and the speed v from an apparatus 304 for ascertaining the speed of the vehicle. From these inputs, the apparatus 300 determines the dimension P, which indicates an assessment of whether a roadway is directional. The dimension P can in turn be used by subscribers 306.

Suitable apparatuses for environment recognition are first of all camera-based systems possibly with object and pattern recognition, ultrasound-based systems, lidar systems, radar systems or the like. The respective system suitable for this purpose outputs, in a manner that is known per se, properties of the vehicle environment such as the number of lanes in the same direction, the width of the lanes, the width of the lane markings, the circle radius of a lane or the reciprocal thereof, that is to say the curvature of a lane, the speed of vehicles traveling in the same direction, the number of vehicles traveling parallel next to one another, the transverse movement of vehicles within a physical partition, the uniformity of the height or depth of the verge development, the interval between the right-hand verge of the roadway and the verge development, a measure of the opaqueness of the traffic guidance, the presence and level of speed limits, the stipulation of overtaking prohibitions, the fact that the vehicle is in a built-up area, that a sign indicating a road restricted to motor vehicles will be passed or has been passed, that a freeway sign will be passed or has been passed, that oncoming traffic is existent on the roadway and/or a measure of the frequency of parked vehicles at the verge of the road.

Furthermore, suitable apparatuses for environment recognition are those that read out the type of the road from digital maps and interpret the digital maps insofar as they output the length of the segment with the same road type and/or the circle radius of the lane of the segment that has the previously determined position of the vehicle in its range. These apparatuses are navigation systems that comprise digital maps, for example. Instead of the circle radius of a lane, the reciprocal of the circle radius, that is to say the curvature of a segment, can also be output.

Subscribers for the dimension P may, as already discussed above, be an emergency steering assistant, a congestion assistant and/or automatic cruise control.

FIG. 4 shows a flowchart for a method 400 according to the invention. Features that are merely optional are shown in dashes.

Depending on whether or not a dimension has already been calculated before the execution of the method, a dimension P is stipulated (S401). This stipulation can comprise setting the dimension P to zero or to another starting value.

An apparatus for environment recognition for a vehicle receives an output A that is based on recognition of the environment at a first instant (S402). The apparatus for environment recognition can periodically or irregularly output the respective output A calculated at an instant.

This output A is provided with an associated factor F (S403), wherein the factor F is also based on the speed v of the vehicle at an instant associated with the output A. The speed v may be the speed at which the vehicle was traveling or that the vehicle had at the at least approximate instant of the output, at the at least approximate instant of the calculation of the output via the apparatus for environment recognition or at the approximate instant of the measurement of input variables by the apparatus for environment recognition.

Preferably, the factor F is based on the multiplication of the speed v by a period of time Δt. The factor F is thus based on the distance (which is only approximate if the speed is changed during the period of time Δt) that the vehicle covers in the period of time Δt, as characterized in expression (1) below, in which v(t) is the speed of the vehicle at the instant t:

$$F = v(t) * \Delta t \quad (1)$$

In order to increase precision, it is also possible to use a mean value for the speed v during the period of time Δt. In an alternative, the factor used as a basis for the factor F can also be the measurement of distance covered in the period of time Δt.

In an advantageous development, the period of time Δt corresponds to the time between two instants at which an output A from the apparatus for environment recognition is received in each case, at which an output A from the apparatus for environment recognition is output in each case, at which recognition of the environment has taken place in each case or which the measurements of the apparatus for environment recognition that resulted in the calculation of the respective output A have been performed in each case.

In addition, the output A is mapped into a rating value x in accordance with a predefined mapping specification (S404). This mapping specification associates a rating value x with an output A. This association takes into account the extent to which the property of the vehicle environment that is represented by the output A indicates a directional roadway.

The rating value x is associated with the output A (S405).

Next, the dimension P is calculated, specifically on the basis of a sum that is based on the rating value weighted with the associated factor and on the previously calculated or stipulated dimension (S406).

The calculation of the dimension P can therefore be characterized as set out in expression (2), wherein $P_{old}$ represents the previously calculated or stipulated dimension:

$$P = F * x + P_{old} \quad (2)$$

The calculated dimension P is then provided (S406).

Preferably, the method 400 is repeated at least once, wherein the repetition prompts reception, from the apparatus for environment recognition, of an output A that is based on recognition of the environment at another instant.

In order to reliably deliver an assessment of the directionality of a roadway, the output from the apparatus for environment recognition is weighted with a factor that is based on the speed of the vehicle. Only in this way is it possible to ensure that the differently timed outputs from the apparatus are used in the assessment in accordance with their significance. This is because the outputs from the apparatus for environment recognition for the vehicle are accorded a different significance on the basis of the speed of the vehicle. In the case of a stationary vehicle, for example, the output calculated at different instants will in most cases map the same environment, which means that the outputs cannot confirm the properties of the environment. This is countered according to the invention by the weighting with the factor based on the speed.

Frequently, a property of vehicle surroundings, such as a particular lane width being exceeded, if occurring only briefly and/or once, does not permit sufficiently certain assessment of whether a directional roadway is present. The inventive method can be used to check such properties for confirmed occurrence or non-occurrence, which means that the dimension P can be used to provide greater certainty of assessment of whether or not a directional roadway is present.

The provision of the calculation result for the dimension P has the advantage that subscribers are themselves able to decide what certainty of assessment, that is to say what value of P, is sufficient for them in order to activate their function or to assume a directional roadway. For automatic cruise control, a lower value of P could be sufficient than for a congestion assistant.

In a preferred development, the method also comprises the limiting of the dimension P to a maximum value. The reaching of the maximum value of the dimension P represents the assessment that a roadway is directional. Further summation of positive values to produce this maximum value does not result in an increase in the dimension P. Conversely, the method may also comprise the limiting of the dimension to a minimum value. Further summation of negative values to produce this minimum value does not result in a decrease in the dimension. In this case, the reaching of the minimum value by the dimension P represents the assessment that a directional roadway is not involved. Advantageously, the maximum value is 1 and the minimum value is 0.

In addition, the method can provide the output R, which indicates which of two threshold values (for example minimum or maximum value) has been reached by the dimension P last (if a threshold value has already been reached). This output R can be understood to be a statement of whether or not a directional roadway has been recognized, for example by virtue of the assumption of the values +1 or −1. In this case, the provision of the dimension P itself can be omitted. Advantageously, the first threshold value is the maximum value and the second threshold value is the minimum value. The statement R can mean that a directional roadway has been recognized, or that it has been recognized that a directional roadway is not present.

The method 400 can also be used to plausibilize statements based on maps that relate to the directionality of a roadway. In this case, outputs from apparatuses for environment recognition on the basis of maps are treated differently than the outputs from other apparatuses for environment recognition. To this end, the method 400 also comprises the reception of an output from an apparatus for environment recognition that takes a map and the current position as a basis for delivering an assessment of whether the vehicle is on a directional roadway. This output is mapped into a further dimension Q, the values of which may be limited to a minimum value and a maximum value (for example 0 and 1). Alternatively, the dimension Q can also be received directly. For this dimension Q, the output S is provided, which indicates which of two threshold values (for example the maximum and minimum values) the dimension Q has reached last (if a threshold value has already been reached) or which indicates whether or not a directional roadway is involved independently thereof. The output S can be understood to be a statement of whether or not a directional roadway has been recognized on the basis of the map and the current position, and can assume the values +1 and −1, for example.

The outputs R and S can be used to provide a superordinate statement concerning the directional roadway RFB. To this end, the outputs R and S are weighted on the basis of their dimensions P and Q with factors G1 and G2 and are summed, as illustrated in expression (3):

$$RFB = G1*R + G2*S \quad (3)$$

The factors G1 and G2 can reflect the significance that is attributed to the quality of the respective statements from the underlying dimensions. In a preferred development, the weights G1 and G2 are based on the dimensions P and Q. The calculation of the dimensions can be effected as illustrated in expression (4) below:

$$G1 = \frac{W1}{W1 + W2}; \quad (4)$$
$$G2 = \frac{W2}{W1 + W2}$$

In this case, the values W1 and W2 can be calculated as follows:
W1 is the same as the dimension P if the output R indicates that the maximum value has been reached most recently,
W1 is the same as the maximum value of P minus the dimension P if the output R indicates that the minimum value has been reached most recently,
W2 is the same as the dimension Q if the output S indicates that the maximum value has been reached most recently,
W2 is the same as the maximum value of Q minus the dimension Q if the output S indicates that the minimum value has been reached most recently.

In this way, the information about the road type, which information is provided from digital maps, can be combined with the outputs from at least one further apparatus for environment recognition and hence plausibilized.

In another preferred development, the method comprises the output of a distance that the vehicle or more precisely the apparatus for environment recognition would have to cover before the dimension P reaches the maximum or minimum value from the current value if the output from the apparatus for environment recognition were to output the last output consistently. In this way, assistance systems can be prepared for the expected future state.

In an advancement of the method 400 in which the factor F is based on the distance covered, the reciprocal of the rating value x preferably represents the limit distance that a vehicle would have to cover for outputs that are consistent with the last output in order to achieve a change in the dimension P by a predetermined absolute value, preferably by the difference between the maximum and minimum values of the dimension P.

In some developments, the method 400 also comprises the provision of the rating value x weighted with the factor F. This weighted rating value x can be used by subscribers to obtain additional information about the dimension P. If a subscriber activates its function only when there is a very high certainty of a roadway being directional, said subscriber can take into account whether the dimension P has reached or exceeded a particular value (for example the maximum value) and whether the rating value weighted with the factor is positive, for example. In more general terms, in some developments the change in the dimension P can be provided.

In an advantageous further development of the invention, the dimension P is set to a maximum or minimum value if an output that a freeway sign will be passed or has been passed is received from an apparatus for environment recognition. This dimension P can then be kept at the value for a predetermined time or distance.

Similarly, the dimension P can be set to a minimum or maximum value if an output that oncoming traffic is existent on the roadway is received from an apparatus for environment recognition, and can possibly be kept at the value for a predetermined time or distance.

In addition, the inventive method can comprise the determination of whether the vehicle is on a freeway. This determination is performed if the dimension P exceeds a predetermined threshold value after which a directional roadway is assumed. The determination that the vehicle is on a freeway is also dependent on at least one of the following conditions having arisen: reception of the output from an apparatus for environment recognition that a sign indicating the beginning of a freeway has been recognized or reception of the output from an apparatus for environment recognition that indicates that, according to a map, the road type of the segment that has the position of the vehicle in its range is a freeway. The finding that the vehicle is on a freeway may be a prerequisite for the activation of particular assistance functions, for example a congestion assistant.

If the dimension P or the output R indicates that the roadway is regarded as non-directional, the method can additionally provide the information concerning whether and in which lane of the roadway oncoming traffic can be expected. If need be, the information can also indicate that it is unknown whether oncoming traffic can be expected in the respective lane. Said provision can take into account an output from an apparatus for environment recognition that indicates which lanes are separated by a solid line. In addition, said provision can take into account an output from an apparatus for environment recognition that indicates the lane in which objects have been recognized and the recognized movement thereof.

In a further exemplary embodiment, the calculation of the dimension P is based on the outputs from two apparatuses for environment recognition. This allows the quality of the recognition to be increased further. In this case, the method comprises the following steps:

If a dimension has not yet been calculated before the first execution of the particularly preferred exemplary embodiment, stipulation of a dimension P; reception of an output from a first apparatus for environment recognition for a vehicle, which output is based on recognition of the environment at a first instant; reception of an output from a second apparatus for environment recognition for a vehicle, which output is based on recognition of the environment at a second instant; wherein the first instant and the second instant may be the same; association of a first factor with the output from the first apparatus, wherein the first factor is also based on the speed of the vehicle at an instant associated with the output from the first apparatus; association of a second factor with the output from the second apparatus, wherein the second factor is also based on the speed of the vehicle at an instant associated with the output from the second apparatus; mapping of the output from the first apparatus into a first rating value in accordance with a first predefined mapping specification; mapping of the output from the second apparatus into a second rating value in accordance with a second predefined mapping specification; association of the first factor with the first rating value; association of the second factor with the second rating value; calculation of the dimension P on the basis of the sum that is based on the first rating value weighted with the associated first factor, on the second rating value weighted with the associated second factor and on the previously calculated or stipulated dimension P; provision of the dimension P.

Preferably, the method also comprises the at least single repetition of the aforementioned steps of the method, wherein the repetition prompts reception, from the first and second apparatuses for environment recognition, of a respective output calculated at another instant.

The advantage of the use of a second apparatus for environmental recognition is that the assessment of whether a directional roadway is present takes into account a further property of the environment. The assessment is improved by this additional information. In general, the assessment is improved with additional outputs from apparatuses for environmental recognition. Therefore, a development of the particularly preferred exemplary embodiment uses more than two apparatuses for environmental recognition and combines the outputs therefrom in a manner similar to that illustrated above. The calculation of P can therefore be described on the basis of expression (5) below:

$$P_j = \Sigma_{i=1}^{N} F_i(t_{i,j}) * x_i(t_{i,j}) + P_{alt} \quad (5)$$

where $P_j$ is the output in the j-th repetition of the method, N denotes the number of apparatuses for environment recognition, $F_i$ is the factor for the i-th apparatus, $t_{i,j}$ is the instant that is relevant to the output of the i-th apparatus and to the j-th repetition and $x_i$ denotes the rating value for the output of the i-th apparatus.

In the case of this further exemplary embodiment, it is also possible for the change in the dimension P to be provided. In addition, the method according to this further exemplary embodiment can likewise be developed further by the developments, further developments, advances or advancements presented above or other optional features of the method 400; these can also be combined with the further exemplary embodiment.

The inventive apparatus can, as a module, also advantageously be combined with other modules, such as a learning map or roadworks recognition (cf. FIG. 7). If the vehicle recognizes that it is on an RFB, this information is automatically loaded into the learning map module and the learning map is adapted accordingly. Exchange of the updated map with other road users or with a central location allows other road users to benefit from the update. The roadworks recognition module can also use the information about the directional roadway.

By means of a combination of the learning map with the directional roadway module, it is possible to adapt the criteria for characterizing the directional roadway or the predefined mapping specifications. This comprises particularly a decrease in the rating values, which means that the output from an apparatus for environment recognition entails a sharper decrease or lesser increase in the dimension P.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
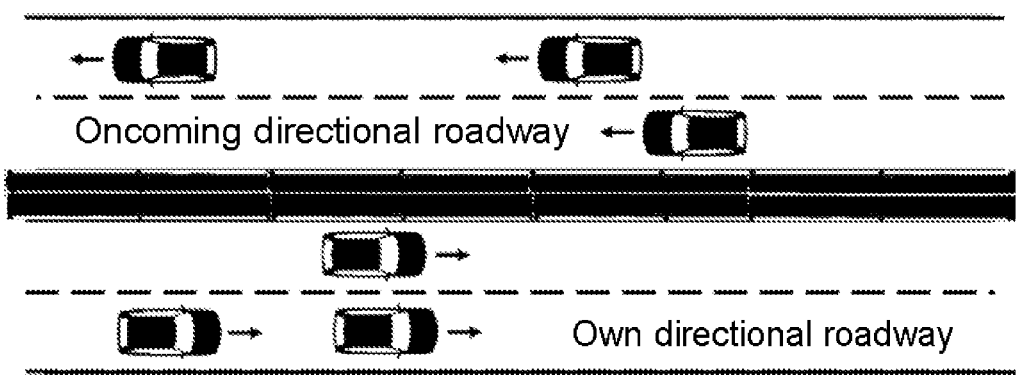
FIG. 1 shows a basic illustration of a freeway.
Figure 2:
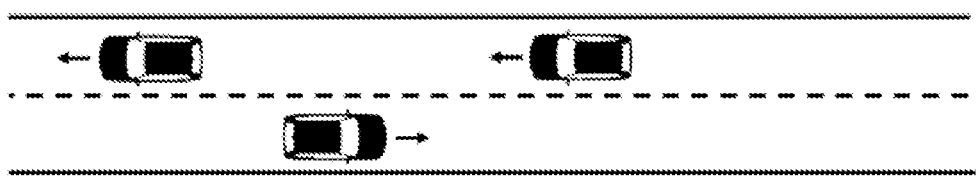
FIG. 2 shows a basic illustration of a normal major road with two roadways, each of which is assigned a direction of travel.
Figure 3:
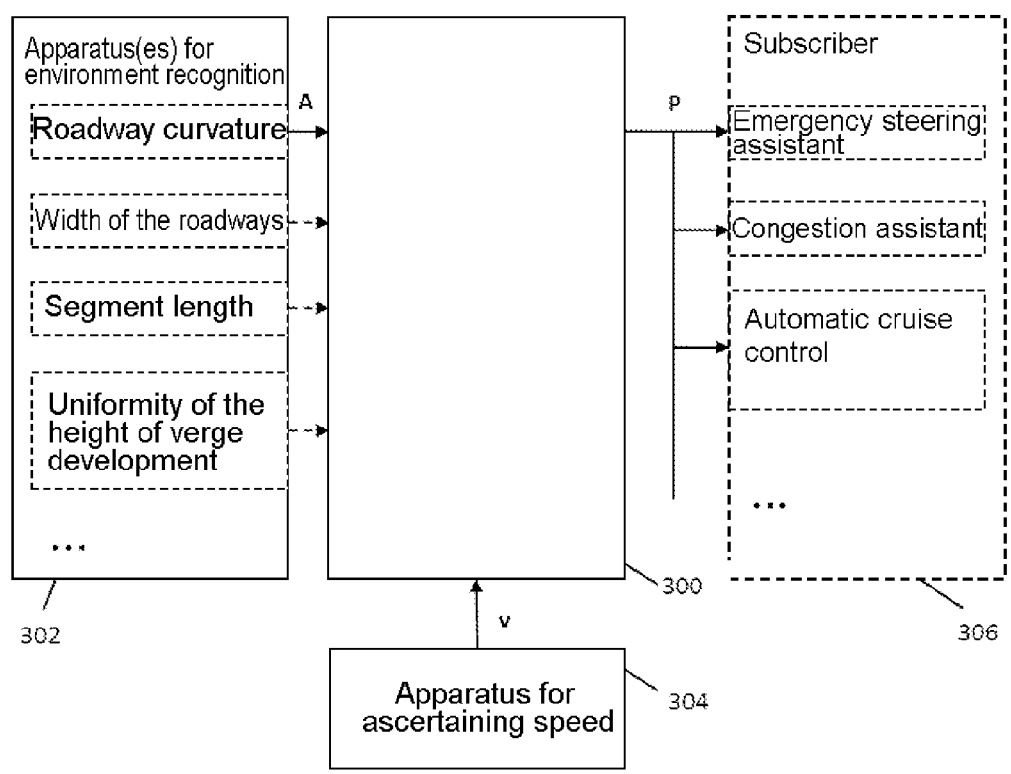
FIG. 3 shows an exemplary inventive apparatus 300.
Figure 4:
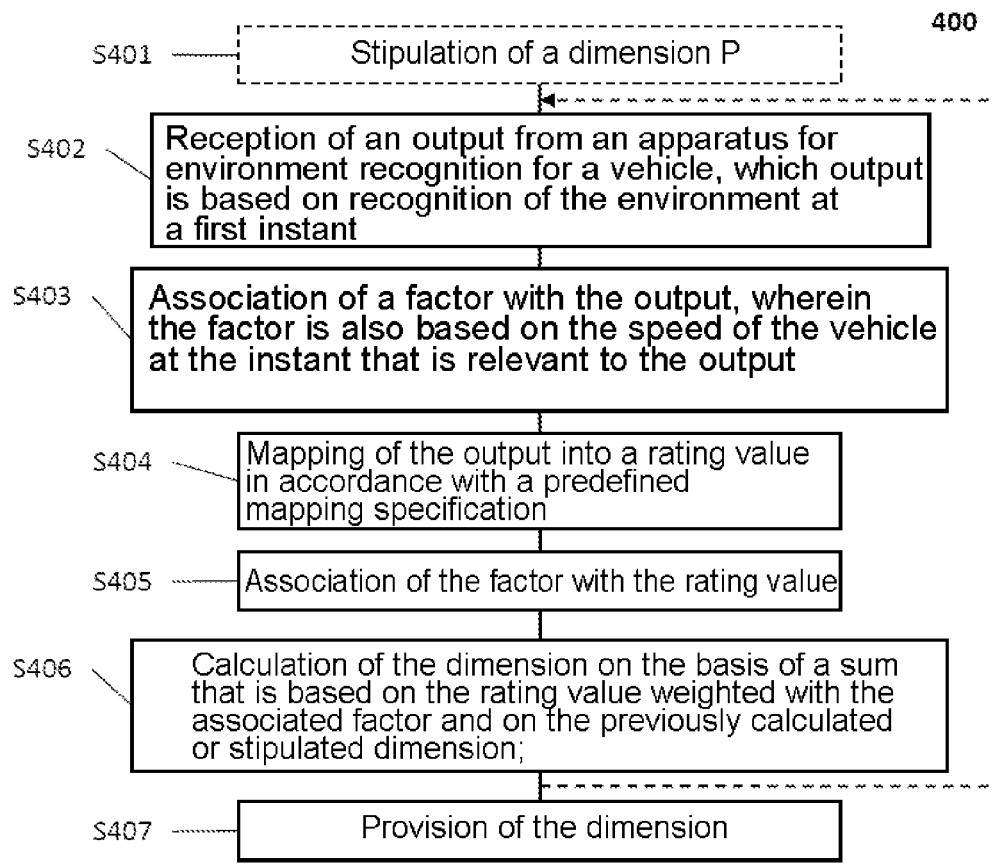
FIG. 4 shows a flowchart for a method 400 according to the invention.

The exemplary embodiment described in detail below is based on the apparatus 300 shown in FIG. 3 that receives an output from two apparatuses for environment recognition. The first apparatus for environment recognition outputs the circle radius of the lane (index 1 below), that is to say the reciprocal of the curvature of the lane. The second apparatus for environment recognition outputs the width of the lane (index 2 below). Typically, the outputs from the apparatuses for environment recognition are received essentially simultaneously and periodically and the period of time between the instances of reception is Δt. For the sake of simplicity, it is assumed below that the outputs from the two apparatuses for environment recognition are received simultaneously and periodically.

The dimension P calculated by the apparatus in accordance with the detailed exemplary embodiment is limited to values between 0 and 1 or 0% and 100%. If the value 0% is reached, this means that the roadway is classified as not a directional roadway, and if the value 100% is reached then this means classification as a directional roadway. This information can be provided as a further output R, specifically by the values +1 (directional roadway) and −1 (not a directional roadway). In this case, the output R remains in its state until the other value is reached.

The two outputs from the apparatuses for environment recognition have the distance (corresponds to the factor F) that the vehicle has covered before reception of the next outputs associated with them by the apparatus 300. In order to determine the distance, the apparatus 300 calculates the product of the speed at the instant t on reception of the output and the period of time Δt.

$$F = v(t) * \Delta t$$

Figure 5:
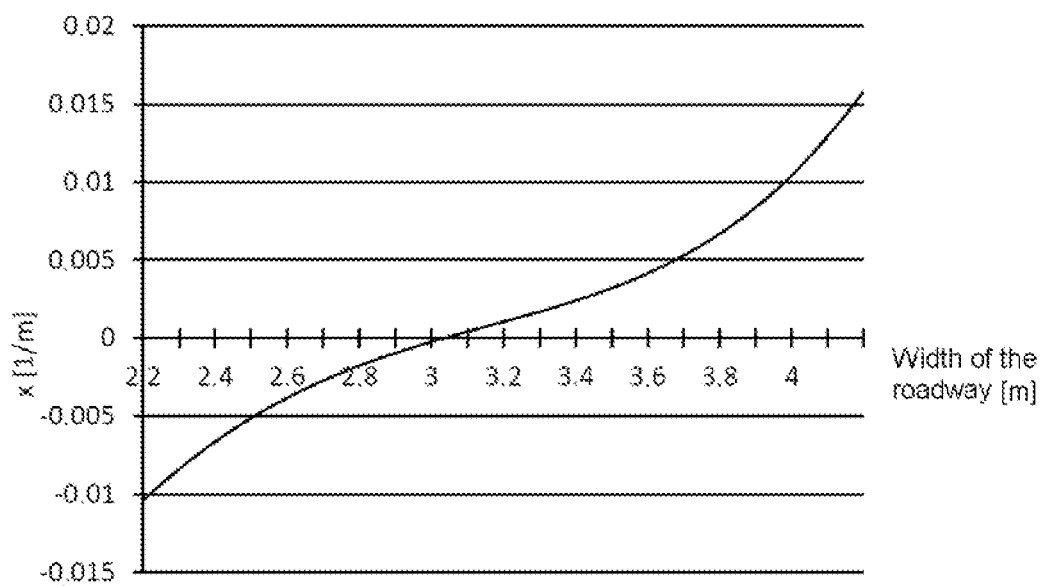
FIG. 5 shows an exemplary mapping specification for widths of a lane.
Figure 6:
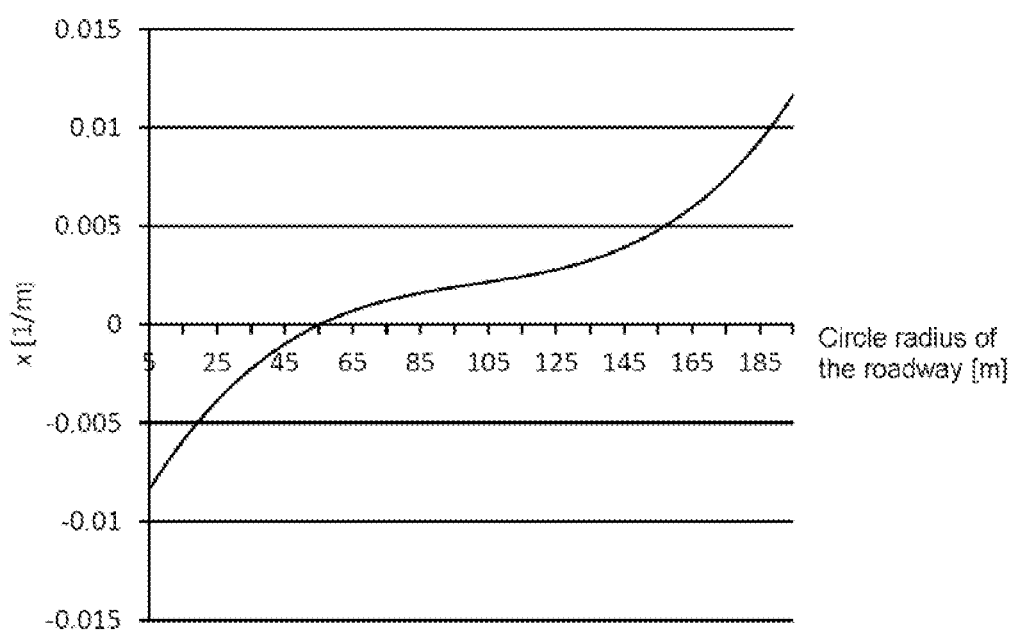
FIG. 6 shows an exemplary mapping specification for various circle radii of a lane.
Figure 7:
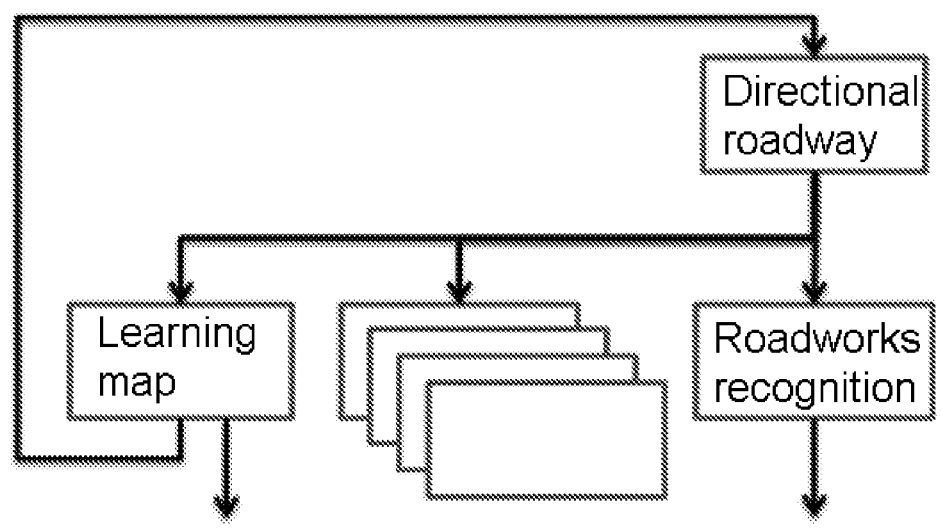
FIG. 7 shows the principle of combining a "directional roadway" module with other modules.

Next, the outputs are each mapped into a rating value x. For the width of the lane, the apparatus 300 uses the mapping specification shown in FIG. 5, for example. For the circle radius of the lane, the apparatus 300 uses the mapping specification shown in FIG. 6, for example. These specifications can be obtained by evaluating recorded trip data and/or can be concomitantly stored in digital maps.

The reciprocal of the individual values from these mapping specifications is in each case the limit distance that the vehicle needs to cover in order, given consistent output, to decrease the dimension P from 100% (that is to say 1) to 0% (that is to say 0) or to increase it from 0% to 100%, depending on whether the rating value is positive or negative and, when the dimension is calculated, only on the basis of this one output, without the second output. By way of example, an output pertaining to the lane width of 3.7 m would give a limit distance of approximately 200 m, and an output pertaining the circle radius of the lane of 620 m would give a limit distance of approximately 200 m.

To calculate the dimension P, the dimension P is initially set to 0. For each new calculation of the dimension, the sum of the rating numbers weighted with the respective factor is then added to the previous dimension.

$$P_j = \sum_{i=1}^{2} F(t_j) * x_i(t_j) + P_{old}$$

In this case:

$$P_j = \sum_{i=1}^{2} v(t_j) * \Delta t * x_i(t_j) + P_{old}$$

where tj denotes the instant of reception of the outputs xi in the j-th repetition of the method, there being at least two repetitions.

This calculation is performed at least for two different instants of the outputs from the apparatuses for environment recognition, and then the dimension P is provided.

In addition, the output R is provided, which indicates whether the dimension P has assumed the value 0 or 1 most recently. R preferably assumes the values −1 and +1. A value of −1 indicates that P has assumed the value 0 most recently, which is interpreted as recognition that the roadway is not directional. A value of +1 indicates that P has assumed the value of 1 most recently, which is interpreted as recognition of a directional roadway.

In addition, the apparatus according to the detailed exemplary embodiment can be used to provide a superordinate statement RFB. This is calculated by combining an output (from an apparatus for environment recognition) based on map data with an output (from an apparatus for environment recognition) based on other environment recognition. The basic concept in this case is to plausibilize the information already known from map data with what are known as soft criteria, e.g. insights about the environment that are obtained from camera recordings.

The apparatus according to the detailed exemplary embodiment receives the dimension Q (preferably with values between 0 and 1), which is the output from an apparatus for environment recognition that is based on map data. For this dimension Q, the output S is provided, which indicates whether the dimension Q has reached a minimum value or maximum value most recently. The output S assumes the values +1 (directional roadway recognized) and −1 (recognition that the roadway is not directional).

The weights are then calculated as follows:

$$G1 = \frac{W1}{W1 + W2};$$
$$G2 = \frac{W2}{W1 + W2}$$

In this case, the values W1 and W2 can be calculated as follows:
 W1 is the same as the dimension P if the output R indicates that the maximum value (1) of the dimension P has been reached most recently,
 W1 is the same as the maximum value of P minus the dimension P if the output R indicates that the minimum value (0) of the dimension P has been reached most recently,
 W2 is the same as the dimension Q if the output S indicates that the maximum value (1) of the dimension Q has been reached most recently,
 W2 is the same as the maximum value (1) of Q minus the dimension Q if the output S indicates that the minimum value (0) of the dimension Q has been reached most recently.

The sum of the weights is clearly always 1. The more certain the recognition of a directional roadway, the closer w1 or w2 will be to the value 1 and the more relative weight is attributed to the corresponding recognition.

Finally, the value for RFB is calculated and provided:

$$RFB = G1*R + G2*S.$$

If RFB assumes the maximum value (for example +1), the most certain recognition of a directional roadway is indicated, whereas the minimum value of RFB (for example 1) indicates with the greatest recognition that a directional roadway is not involved. The values in between are recognition results with lower certainty or confidence.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing an assessment of whether a roadway is directional, comprising the acts of:
 stipulating a dimension if not previously calculated;
 receiving an output from an apparatus for environment recognition for a vehicle, which output is based on recognition of an environment of the vehicle at one instant, wherein the apparatus for environment recognition comprises at least one of a video camera, a radar, a lidar, an ultrasonic sensor, and a navigation system of the vehicle;
 associating a factor with the output, wherein the factor is based on a speed of the vehicle at the instant associated with the output;
 mapping the output into a rating value in accordance with a predefined mapping specification;
 associating the factor with the rating value;
 calculating the dimension based on a sum that is based on the rating value weighted with the associated factor, and on the previously calculated or stipulated dimension;

providing the dimension to at least one of an emergency steering assistant, a congestion assistant and/or automatic cruise control of the vehicle; and activating the at least one of the emergency steering assistant, the congestion assistant and the automatic cruise control based on the dimension.

2. The method as claimed in claim 1, further comprising:
repeating the acts of claim 1 at least once, wherein said repeating prompts reception, from the apparatus for environment recognition, of an output that is based on recognition of the environment at another instant.

3. The method as claimed in claim 2, wherein the factor is also based on a period of time, and wherein the factor is based on the distance covered by the vehicle in the period of time.

4. The method as claimed in claim 3, wherein the period of time is based on the period of time between said instant and said other instant.

5. The method as claimed in claim 1, further comprising providing one of the rating value weighted with the associated factor and a dimension change.

6. The method as claimed in claim 1, wherein the factor is based on the distance covered by the vehicle, and wherein the method further comprising:
outputting a distance that the vehicle would have to cover before the dimension would reach a maximum or minimum value starting from a current value of the dimension, and for repeating said calculating if the outputs from the apparatus for environment recognition were to be consistent with the last output.

7. The method as claimed in claim 1, wherein the factor is based on a distance covered by the vehicle, and wherein a reciprocal of the rating value is a limit distance that the vehicle would have to cover for outputs that are consistent with the last output and for repeating said calculating in order to achieve a change in the dimension by a predetermined absolute value.

8. The method as claimed in claim 1, further comprising:
stipulating the dimension as a predefined value if a predefined output from the apparatus for environment recognition or from another apparatus for environment recognition is received, in response to the output is received indicating that oncoming traffic is present within the physical partition or that a sign indicating the beginning or end of a freeway has been recognized.

9. The method as claimed in claim 1, further comprising:
limiting the dimension to a maximum value after which the dimension is not increased further; and
limiting the dimension to a minimum value after which the dimension is not decreased further.

10. The method as claimed in claim 9, further comprising:
providing an output, wherein
the output is set to a first state when the dimension reaches the maximum value, and
the output is set to a second state when the dimension reaches the minimum value.

11. The method as claimed in claim 1, wherein the dimension is a first dimension, and wherein the method further comprising:
receiving a second dimension that takes a map and the current position of the vehicle as a basis for delivering an assessment of whether a roadway is directional;
mapping of the first dimension into a first output;
determining a first weight for the first output;
mapping of the second dimension into a second output;
determining a second weight for the second output;
calculating a third dimension on the basis of the first statement weighted with the first weight and the second statement weighted with the second weight; and
providing the third dimension.

12. The method as claimed in claim 11, wherein
the first weight is also based on the first dimension, and
the second weight is also based on the second dimension.

13. The method as claimed in either of claim 11, wherein the mapping of the first dimension comprises:
setting of the first output to a first state when the first dimension reaches a first maximum value;
setting of the first output to a second state when the first dimension reaches a first minimum value,
wherein the mapping of the second dimension comprises:
setting of the second output to a third state when the second dimension has reached a second maximum value most recently;
setting of the second output to a fourth state when the second dimension has reached a second minimum value most recently,
wherein the first and third states may be the same,
wherein the second and fourth states may be the same,
wherein the first maximum value may be the same as the second maximum value,
wherein the first minimum value may be the same as the second minimum value.

14. A method for providing an assessment of whether a roadway is directional, comprising the acts of:
stipulating a dimension if not previously calculated;
receiving an output from a first apparatus for environment recognition for a vehicle, which output is based on recognition of an environment of the vehicle at a first instant, wherein the apparatus for environment recognition comprises at least one of a video camera, a radar, a lidar, an ultrasonic sensor, and a navigation system of the vehicle;
receiving an output from a second apparatus for environment recognition for a vehicle, which output is based on recognition of the environment at a second instant, wherein the first instant and the second instant may be the same;
associating a first factor with the output from the first apparatus, wherein the first factor is further based on the speed of the vehicle at the first instant associated with the output from the first apparatus;
associating a second factor with the output from the second apparatus, wherein the second factor is further based on the speed of the vehicle at the second instant associated with the output from the second apparatus;
mapping the output from the first apparatus into a first rating value in accordance with a first predefined mapping specification;
mapping the output from the second apparatus into a second rating value in accordance with a second predefined mapping specification;
associating the first factor with the first rating value;
associating the second factor with the second rating value;
calculating the dimension based on a sum that is based on the first rating value weighted with the associated first factor, on the second rating value weighted with the associated second factor and on the previously calculated or stipulated dimension;
providing the dimension to at least one of an emergency steering assistant, a congestion assistant and/or automatic cruise control of the vehicle; and activating the at least one of the emergency steering assistant, the congestion assistant and the automatic cruise control based on the dimension.

15. The method as claimed in claim 14, further comprising:
repeating the acts of claim 14 at least once, wherein said repeating prompts reception, from the first and second apparatuses for environment recognition, of a respective output that is based on recognition of the environment at a respective other instant.

16. The method as claimed in claim 14, further comprising:
limiting the dimension to a maximum value after which the dimension is not increased further; and
limiting the dimension to a minimum value after which the dimension is not decreased further.

17. The method as claimed in claim 16, further comprising:
providing an output, wherein
the output is set to a first state when the dimension reaches the maximum value, and
the output is set to a second state when the dimension reaches the minimum value.

18. The method as claimed in claim 14, wherein the dimension is a first dimension, and wherein the method further comprising:
receiving a second dimension that takes a map and the current position of the vehicle as a basis for delivering an assessment of whether a roadway is directional;
mapping of the first dimension into a first output;
determining a first weight for the first output;
mapping of the second dimension into a second output;
determining a second weight for the second output;
calculating a third dimension on the basis of the first statement weighted with the first weight and the second statement weighted with the second weight; and
providing the third dimension.

19. The method as claimed in claim 18, wherein
the first weight is also based on the first dimension, and
the second weight is also based on the second dimension.

20. An apparatus is configured to:
stipulate a dimension if not previously calculated,
receive an output from an apparatus for environment recognition for a vehicle, which output is based on recognition of an environment of the vehicle at one instant, wherein the apparatus for environment recognition comprises at least one of a video camera, a radar, a lidar, an ultrasonic sensor, and a navigation system of the vehicle,
associate a factor with the output, wherein the factor is based on a speed of the vehicle at the instant associated with the output,
map the output into a rating value in accordance with a predefined mapping specification,
associate the factor with the rating value,
calculate the dimension based on a sum that is based on the rating value weighted with the associated factor, and on the previously calculated or stipulated dimension,
provide the dimension to at least one of an emergency steering assistant, a congestion assistant and/or automatic cruise control of the vehicle, and
activating the at least one of the emergency steering assistant, the congestion assistant and the automatic cruise control based on the dimension.

* * * * *